US005548510A

United States Patent [19]
Ebert et al.

[11] Patent Number: 5,548,510
[45] Date of Patent: Aug. 20, 1996

[54] METHOD AND APPARATUS FOR PROVIDING A UNIVERSAL ELECTRICAL INTERFACE BETWEEN AN AIRCRAFT AND AN ASSOCIATED STORE

[75] Inventors: William J. Ebert, Catawissa; James V. Leonard, St. Charles; Jeffrey L. Johnson, Chesterfield, all of Mo.

[73] Assignee: McDonnell Douglas Corporation, St. Louis, Mo.

[21] Appl. No.: 332,572

[22] Filed: Oct. 28, 1994

[51] Int. Cl.⁶ .............................. G06F 13/00; F41F 3/06
[52] U.S. Cl. ...................... 364/443; 364/424.01; 395/883
[58] Field of Search .............................. 364/424.01, 423, 364/424.06; 235/400; 89/1.56, 1.801, 1.813; 244/3.11, 3.14, 3.16; 348/117; 395/821, 840, 841, 882, 883, 892, 500

[56] References Cited

U.S. PATENT DOCUMENTS

| | | | |
|---|---|---|---|
| 4,500,933 | 2/1985 | Chan | 360/69 |
| 4,586,159 | 4/1986 | Thomas et al. | 364/900 |
| 4,897,799 | 1/1990 | Le Gall et al. | 364/514 |
| 5,034,686 | 7/1991 | Aspelin | 324/158 R |
| 5,036,465 | 7/1991 | Ackerman, Jr. et al. | 364/423 |
| 5,036,466 | 7/1991 | Fitzgerald et al. | 364/423 |
| 5,129,063 | 7/1992 | Sainola et al. | 395/821 |
| 5,229,538 | 7/1993 | McGlynn et al. | 89/1.56 |
| 5,377,109 | 12/1994 | Baker et al. | 364/424.06 |

*Primary Examiner*—Michael Zanelli
*Attorney, Agent, or Firm*—Bell, Seltzer, Park & Gibson, P.A.

[57] ABSTRACT

A method and apparatus for providing a universal electrical interface between an aircraft and an associated store includes an aircraft interface and a store interface for bidirectionally communicating with the aircraft according to a first predetermined format and with the associated store according to a second predetermined format, respectively, as well as a universal signal conditioner for selectively processing signals received by both the aircraft interface and the store interface. The selective processing includes translating the signals received by the aircraft interface to the second predetermined format of the associated store and translating signals received by the store interface to the first predetermined format of the aircraft. The universal electrical interface also determines the type of aircraft from a number of predetermined types of aircraft, each of which is adapted to process signals according to a different predetermined format. By providing such selective processing of signals of different formats, each of the different types of aircraft can bidirectionally communicate, according to the predetermined format that the aircraft is adapted to process, with the associated store.

11 Claims, 2 Drawing Sheets

METHOD AND APPARATUS FOR PROVIDING A UNIVERSAL ELECTRICAL INTERFACE BETWEEN AN AIRCRAFT AND AN ASSOCIATED STORE

FIELD OF THE INVENTION

The present invention relates generally to a signal conditioning method and apparatus and, more particularly, to a method and apparatus for providing an electrical interface between an aircraft and an associated store.

BACKGROUND OF THE INVENTION

Modern aircraft, such as an F-15E aircraft manufactured by McDonnell Douglas Corporation, the assignee of the present invention; and the P-3, the S-3 and the F-16 aircraft manufactured by Lockheed Aeronautical Systems Company, are adapted to carry stores. These stores can, for example, include missiles, such as the Walleye missile, the Standoff Land Attack missile (SLAM) and the Maverick missile. A missile is generally mounted to the wing of a host aircraft, typically via disconnectable pylons, such that the aircraft can carry the missile to the vicinity of the target destination prior to its deployment.

Prior to, during and even after deployment of a store, the aircraft and the associated store communicate. For example, signals are bidirectionally transmitted between the aircraft and the store to appropriately configure and launch the store. This prelaunch configuration can include downloading the coordinates of the target and initializing the various sensors of the store. In addition, a store, such as a SLAM missile, can transmit a video image, typically via radio frequency (RF) signals, of the target to the aircraft after deployment so that the flight path of the store can be monitored, and, in some instances, controlled to provide greater targeting accuracy.

In order to provide bidirectional signal transmission between the aircraft and the associated store, a host aircraft typically includes an aircraft controls and displays module. The aircraft controls and displays module provides an interface by which the crew of the aircraft can monitor and control their flight pattern and can provide armament control, such as to control the deployment of the associated store. The aircraft controls and displays module typically includes both discrete controls, such as toggle switches, as well as a joystick for positioning and selecting a cursor within the associated display. The aircraft controls and displays module also provides the necessary avionics to fly the aircraft and to communicate with other aircraft and ground base control stations.

The bidirectional communication between the host aircraft and at least some associated missiles is further facilitated by a second type of store, namely a data link pod. The data link pod, such as an AN/AWW-13 or AN/AWW-14 data link pod, is associated with the missile to provide a video interface with the aircraft controls and displays module. For example, a data link pod is typically employed in conjunction with a SLAM missile to provide an RF data link between the SLAM missile and the host aircraft.

Both the aircraft and the associated store typically process signals according to a predetermined format. As used herein, format refers not only to the actual configuration of the data structures, but also to the content and order of transmission of the signals. The predetermined formats of the aircraft and the store are oftentimes different. In order to ensure proper signal reception by the host aircraft and the associated store, the signals must thus be provided to the aircraft or store in the predetermined format that the aircraft or store is adapted to process.

In addition, each different type of aircraft and each different type of store generally processes signals according to a different predetermined format. In order to ensure that signals are transmitted between the aircraft and the associated store according to the proper predetermined format, each store is typically adapted to be mounted and deployed by only predetermined types of aircraft. Thus, a missile and its associated data link pod, if any, can be configured to process signals according to the predetermined format of the predetermined types of aircraft from which it is adapted to be deployed in order to ensure proper transmission of signals therebetween. By limiting each type of store to deployment from only certain predetermined types of aircraft, however, the flexibility with which stores can be deployed from aircraft is significantly restricted.

Likewise, aircraft are typically designed to interface with and deploy only one or more predetermined types of stores to ensure that signals are properly transmitted therebetween. By limiting each aircraft in the types of stores which it can deploy, however, the flexibility with which aircraft can deploy stores is further restricted.

One method and system for controlling and monitoring a store is disclosed in U.S. Pat. No. 5,036,465 issued Jul. 30, 1991 to Ackramin, Jr. et al. (the '465 patent), U.S. Pat. No. 5,036,466 issued Jul. 30, 1991 to Fitzgerald et al. (the '466 patent) and U.S. Pat. No. 5,129,063 issued Jul. 7, 1992 to Sianola et al. (the '063 patent), each of which are assigned to Grumman Aerospace Corporation. The '465, '466 and '063 patents disclose data processing systems for supporting an armament system. In particular, the '465, '466 and '063 patents disclose methods and systems for deploying several types of stores from a single aircraft.

The systems and methods disclosed in the '465, '466 and '063 patents, however, require modification of the central control processor of the aircraft and the addition of even more interface electronics to the aircraft controls and display module. Accordingly, the methods and systems of the '465, '466 and '063 patents further increase the demand on the central control processor of the aircraft which must not only process flight and targeting data, but also must provide an interface with a variety of types of stores. The store control and monitoring system of the '456, '466 and '063 patents is further limited by requiring the type of aircraft from which the store is to be deployed to be known in order to properly configure the central control processor and the aircraft controls and displays unit to interface with the different types of stores.

Therefore, while it would be desirable to increase the flexibility with which stores can be deployed from aircraft such that a plurality of types of stores could be launched from a plurality of types of aircraft, the methods and systems developed to date have not readily provided such flexibility. In addition, it would be desirable to increase the flexibility with which a store can be deployed from a plurality of types of aircraft without increasing the demand on the aircraft's central control processor, adding additional electronics to the aircraft controls and displays module or modifying the command sequence and associated displays employed by crew to deploy an associated store.

SUMMARY OF THE INVENTION

In view of the foregoing background, it is therefore an object of the present invention to provide an improved signal conditioning method and apparatus.

It is also an object of the present invention to provide an improved electrical interface between an aircraft and an associated store.

It is a further object of the present invention to provide a universal electrical interface between a plurality of different types of aircraft and an associated store.

These and other objects are provided, according to the present invention, by a signal conditioning method and apparatus which provides a universal electrical interface or interconnection between a plurality of different types of aircraft, each of which is adapted to communicate according to a different predetermined format, and an associated store that is adapted to communicate according to a different predetermined format. Accordingly, a single store can be deployed from a plurality of types of aircraft, each of which communicates according to a different format, without increasing the load on the central control processor of the aircraft, altering the electrical wiring of the aircraft or modifying the commands employed by the crew in deploying the store.

The signal conditioning apparatus of the present invention includes aircraft identification means for determining the type of the aircraft. The signal conditioning apparatus also includes communications means for providing bidirectional communications between the aircraft and the associated store. The communications means preferably includes aircraft interface means for bidirectionally communicating with the aircraft according to a first predetermined format that the type of aircraft, identified by the aircraft identification means, is adapted to process. Further, the communications means preferably includes store interface means for bidirectionally communicating with the associated store according to the second predetermined format that the associated store is adapted to process signals. Typically, the first and second predetermined formats are different.

The present invention also includes signal conditioning means, responsive to both the aircraft identification means and the communications means, for selectively processing signals received by the communications means according to the type of the associated aircraft. Thus, each different type of aircraft can bidirectionally communicate, according to the predetermined format that the aircraft is adapted to process, with the associated store. The signal conditioning means can also include means for translating the signals received by the communications means from the aircraft according to the first predetermined format to the second predetermined format of the associated store prior to transmitting the signals, via the communications means, to the associated store. In addition, the signal conditioning means can include means for translating the signals received by the communications means from the associated store according to the second predetermined format to the first predetermined format of the aircraft prior to transmitting the signals, via the communications means, to the aircraft.

The signal conditioning apparatus of the present invention can also include interrogation means for determining the type of store associated with the aircraft. The type of store is one of a plurality of predetermined types of stores, each of which is adapted to process signals formatted according to a different predetermined format.

In one embodiment, the signal conditioning apparatus includes discrete signal processing means for processing discrete signals received by the communications means from both the aircraft and the associated store. This embodiment of the signal conditioning means also includes analog signal conversion means for converting analog signals received by the communications means from the aircraft to corresponding digital signals prior to transmitting the corresponding digital signals to the associated store. Further, the signal conditioning apparatus of this embodiment preferably includes digital signal converting means for converting digital signals received by the communications means from the associated store to corresponding analog signals prior to transmitting the corresponding analog signals to the aircraft.

The communications means and, in particular, the store interface means preferably includes primary and reserve data buses for transmitting signals to and from the associated store, and a bus controller for controlling signal transmission on both the primary reserve data buses. Preferably, the signal transmission on the primary and reserve data buses is controlled such that signals are transmitted via the primary data bus if the primary data bus is available, and are transmitted via the reserve data bus only if the primary data bus is unavailable. In one embodiment, the primary data bus is polled to determine if the primary data bus is available. If the polled primary data bus is available, signals are transmitted via the primary data bus. However, if the polled primary data bus is unavailable, signals are transmitted via the reserve data bus.

The signal conditioning apparatus of the present invention can also include power switching means, responsive to the signal conditioning means, for coupling electrical power from the aircraft to the associated store. In addition, the signal conditioning apparatus can include video relay means, responsive to the signal conditioning means, for coupling video signals from the associated store to the aircraft.

Thus, a store can be electrically interconnected with a plurality of different types of aircraft, each of which process signals according to a different predetermined format. Accordingly, a store can communicate with and be deployed from a plurality of different types of aircraft without modifying the electrical wiring of the aircraft or altering the commands or displays employed by the crew of the aircraft to deploy the store. Consequently, the number of aircraft that are able to communicate with and deploy a store is significantly increased and the flexibility of store deployment is correspondingly increased. In addition, the signal conditioning method and apparatus of one embodiment of the present invention enables a plurality of different types of stores, each of which also process signals according to a different predetermined format, to be deployed from each of a plurality of different types of aircraft. Thus, the flexibility of store deployment is further increased by the method and apparatus of this embodiment.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
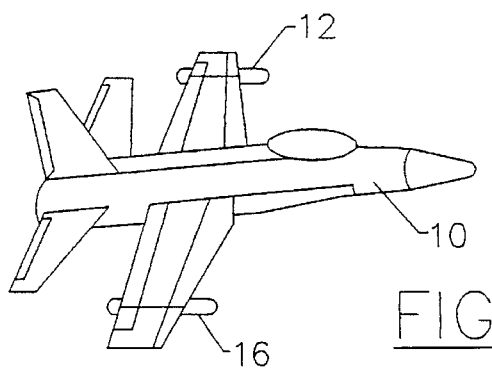
FIG. 1 is a perspective view of an aircraft and an associated store.

Referring now to FIG. 1, an aircraft 10 and two types of associated stores are illustrated. The aircraft can be, for example, an F-15 Eagle aircraft manufactured by McDonnell Douglas Corporation, the assignee of the present invention, or an F-16 Falcon aircraft manufactured by Lockheed Aeronautical Systems Company. The aircraft can also be, however, any number of other aircraft adapted to communications with and deploy stores without departing from the spirit and scope of the present invention. Likewise, one type of associated store is a missile 12, such as a Walleye missile, a Standoff Land Attack Missile (SLAM) or a Maverick missile. However, the associated store can be any of a variety of other missiles which are adapted to be aerially deployed from an aircraft.

As also illustrated in FIG. 1, a second type of associated store is a data link pod 16 which provides a radio frequency (RF) video interface between a host aircraft 10 and at least some types of associated missiles 12, such as SLAM missiles, following deployment. Exemplary data link pods can include the AN/AWW-13 and AN/AWW-14 guided weapon interfaces developed by the Navel Avionics Center. The AN/AWW-13 guided weapon interface is described in greater detail in Publication No. 1342AS114 dated Nov. 15, 1988 by the Naval Avionics Center. The associated store can be any of a variety of other types of data link pods, however, without departing from the spirit and scope of the present invention. In addition, the signal conditioning method and apparatus of the present invention can be employed in conjunction with missiles, such as Maverick missiles, which do not communicate with the host aircraft via a data link pod following deployment as described hereinafter.

Figure 2A:
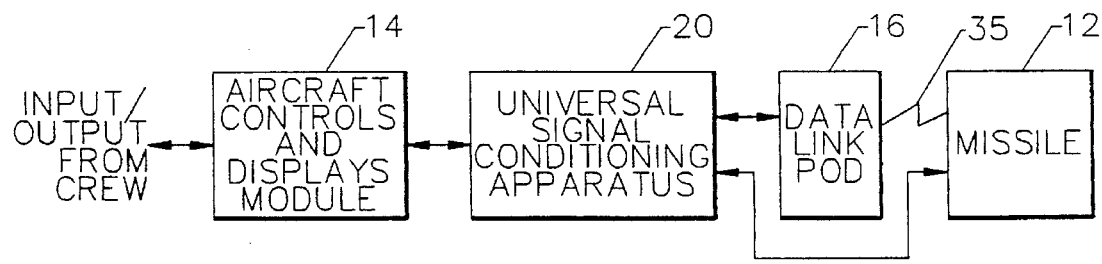
FIG. 2A is a block diagram illustrating one embodiment of a universal signal conditioning apparatus of the present invention and the associated aircraft controls and displays module, data link pod and missile.
Figure 2B:
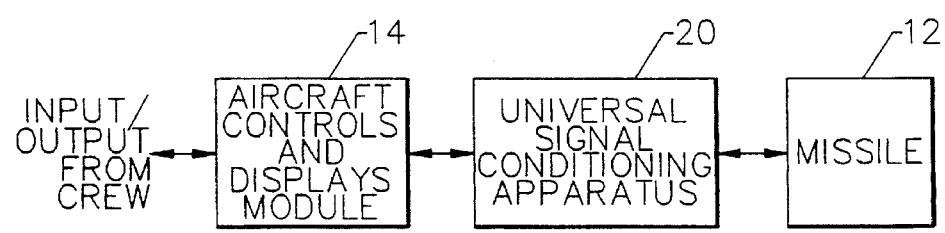
FIG. 2B is a block diagram illustrating another embodiment of a universal signal conditioning apparatus of the present invention and the associated aircraft controls and displays module and missile.

As schematically illustrated in FIGS. 2A and 2B, the aircraft 10 includes an aircraft controls and displays module 14. This module provides the unique electrical circuitry which controls the flight of the aircraft and the deployment of the armament systems, including the deployment of an associated missile 12. The controls and displays module also provides a display for the crew such that they can further monitor the flight of the aircraft and the deployment of the associated missiles. The aircraft controls and displays module is also adapted to receive input from the crew to control the flight of the aircraft and the deployment of the associated missiles.

To perform these and other functions, the aircraft controls and displays module 14 processes a variety of signals according to a predetermined format. As explained above, each type of aircraft 10 generally processes signals according to a different predetermined format. In addition, the aircraft controls and displays module of each different type of aircraft typically includes a different set of controls and displays through which the crew of the aircraft interact with the aircraft controls and displays module to fly the aircraft and deploy any associated missile 12.

According to the present invention, the aircraft 10 also includes a universal signal conditioning apparatus 20 which provides a universal electrical interconnection between the aircraft controls and displays module 14 and an associated store such that an aircraft can deploy a plurality of different types of missiles 12, at least some of which process signals according to a different predetermined format than the aircraft controls and displays module. Likewise, one embodiment of the universal signal conditioning apparatus of the present invention also allows a missile to be deployed from a plurality of different types of aircraft, at least some of which process signals according to a different predetermined format than the missile.

As schematically illustrated in FIG. 2A, one embodiment of the universal signal conditioning apparatus 20 is preferably disposed between and bidirectionally communicates with the aircraft controls and displays module 14 and the data link pod 16 and an associated store, such as a missile 12. More specifically, the universal signal conditioning apparatus of this embodiment directly provides the missile with power, typically three-phase power, and and release signal which triggers the deployment of the missile. In addition, the universal signal conditioning apparatus of this embodiment bidirectionally communicates with the data link pod which, in turn, is adapted to communicate via RF signals 35 with an associated missile, such as a SLAM missile. While the RF data link 35 can be established between the data link pod and the missile prior to deployment, the RF data link is typically established during or following deployment such that the missile can transmit a video image, such as of the target, to the data link pod and, in turn, to the aircraft controls and displays module 14. As known to those skilled in the art, only predetermined types of missiles, such as SLAM missiles, are adapted to communicate via an RF data link with a data link pod to provide video images following deployment according to this embodiment of the present invention.

Another embodiment of the present invention is illustrated in FIG. 2B in which the universal signal conditioning apparatus 20 communicates bidirectionally with the associated missile 12. According to this embodiment, the missile, such as a Maverick missile, is adapted to directly communicate with the universal signal conditioning apparatus without the assistance of a data link pod 16.

In either embodiment, the universal signal conditioning apparatus 20 is typically a module which mates with the existing hardware and software of the aircraft 10, the associated missile 12 and the data link pod 16, if any, such that the hardware and software of the aircraft, the associated missile and the data link pod need not be modified. Further, the universal signal conditioning apparatus is typically physically mounted in the pylons or in the fuselage of the aircraft. However, the universal signal conditioning apparatus can be mounted in a variety of locations within the aircraft without departing from the spirit and scope of the present invention.

Figure 3:
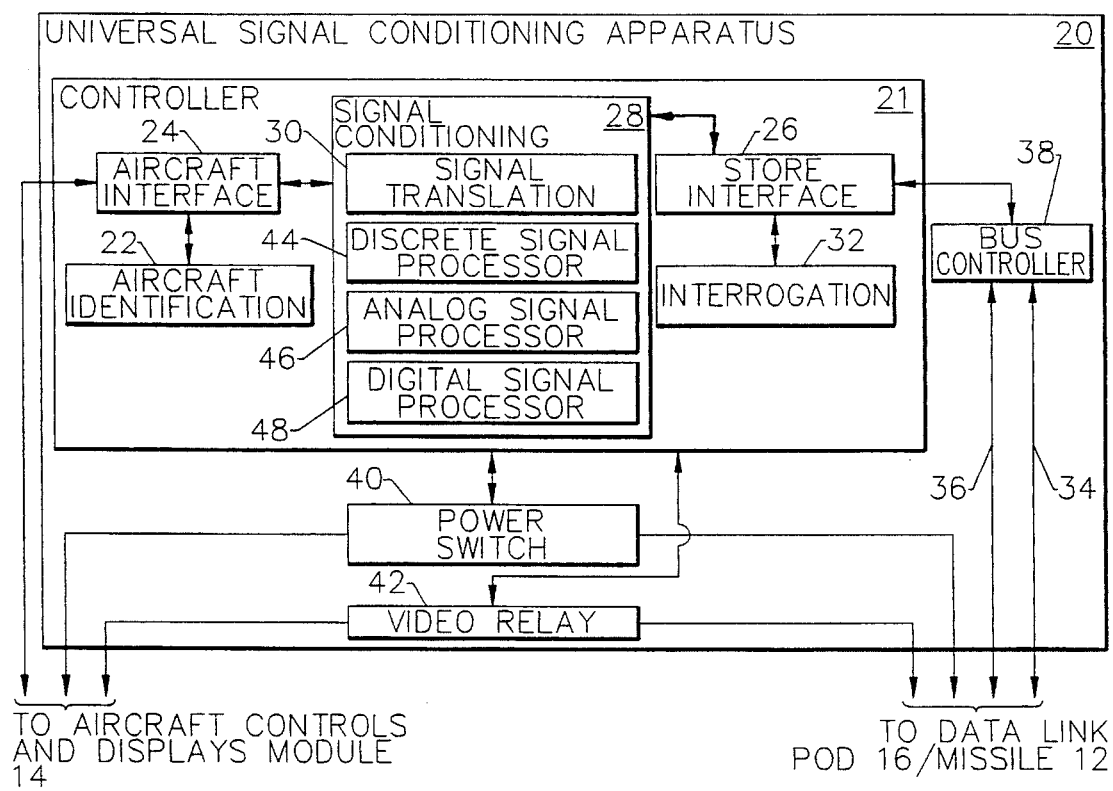
FIG. 3 is a detailed block diagram of a universal signal conditioning apparatus according to the present invention.

As illustrated in block diagram form in FIG. 3, the universal signal conditioning apparatus 20 typically includes a controller 21, such as a microprocessor or microcontroller, and an associated memory device for providing an electrical interface between an aircraft 10 and the associated store, either a missile 12 or a data link pod 16. As illustrated, the controller 21 preferably includes aircraft identification means 22 for determining the type of the aircraft. The type of aircraft is preferably one of a plurality of predetermined types of aircraft, each of which is adapted to process signals formatted according to a different predetermined format. Typically, the aircraft controls and displays module 14 produces an identifying signal to the universal signal conditioning apparatus which identifies the type of the host aircraft.

The universal signal conditioning apparatus 20 and, in particular, the controller 21 also includes communications means for bidirectionally communicating with the aircraft controls and displays module 14 and the associated store, either a missile 12 or a data link pod 16. More specifically, the communications means preferably includes aircraft interface means 24 and store interface means 26. The aircraft interface means bidirectionally communicates with the aircraft 10 according to the first predetermined format which the type of aircraft identified by the aircraft identification means 22 is adapted to process. Likewise, the store interface means bidirectionally communicates with the associated store according to a second predetermined format that the associated store is adapted to process. Typically, the second predetermined format is different than the first predetermined format such that the aircraft and the associated store would be unable to effectively communicate without the universal signal conditioning apparatus of the present invention.

The controller 21 of the universal signal conditioning apparatus 20 also includes signal conditioning means 28, responsive to the aircraft identification means 22 and the communications means, for selectively processing signals received by the communications means, including signals received by both the aircraft interface means 24 and the store interface means 26. The signal conditioning means selectively processes the signals according to the type of aircraft identified by the aircraft identification means such that each of the plurality of different types of aircraft 10 can bidirectionally communicate, according to the predetermined format that the particular type of aircraft is adapted to process, with the associated store 12.

In order to provide bidirectional communication between each of the plurality of different types of aircraft 10 and the associated store 12, the signal conditioning means 28 generally includes signal translation means 30. The signal translation means includes means for translating signals received from the aircraft interface means 24 according to the first predetermined format to the second predetermined format that the associated store 12 is adapted to process prior to transmitting the translated signals to the associated store. In addition, the signal translation means includes means for translating signals received from the store interface means 26 according to the second predetermined format to the first predetermined format that the aircraft, as identified by the aircraft identification means 22, is adapted to process prior to transmitting the translated signals to the aircraft.

The universal signal conditioning apparatus 20 and, more particularly, the controller 21 can also include interrogation means 32, responsive to the signal conditioning means, for determining the type of store associated with the aircraft 10. The type of store is preferably one of the plurality of predetermined types of stores, each of which is adapted to process signals formatted according to a different predetermined format. For example, the associated stores can include a Walleye missile, a SLAM missile, a Maverick missile, an AN/AWW-13 data link pod, an AN/AWW-14 data link pod or any other similar type of store. As explained above, the universal signal conditioning apparatus of the present invention thus allows different types of stores, adapted to process signals according to different predetermined formats, to communicate with an aircraft that may be adapted to process signals according to yet another predetermined format.

The store interface means 26 of one embodiment includes both a primary and a reserve data bus 34 and 36, respectively, for transmitting signals to and from the associated store 12. In this embodiment, the store interface means also includes a bus controller 38, such as a MIL-STD-1553B bus controller, for controlling signal transmission on the primary and reserve data buses between the associated store and the signal conditioning means 28. Preferably, signals are initially attempted to be transmitted via the primary data bus and, if the primary data bus is unavailable, the signals are transmitted via the reserve data bus. By providing both the primary and reserve data buses, the reliability of signal transmission between the associated store and signal conditioning means is further enhanced.

One embodiment of the universal signal conditioning apparatus 20 of the present invention also includes power switching means 40, responsive to the signal conditioning means 28, for coupling electrical power from the aircraft 10 to the associated store. In another embodiment, the universal signal conditioning apparatus includes video relay means 42, responsive to the signal conditioning means, for transmitting video signals from the associated missile 12 to the aircraft via the data link pod 16. In particular, the associated missile typically transmits RF video signals to the host aircraft via the data link 35 with the data link pod following its deployment. The crew of the aircraft can thereby monitor the video signals and, in some instances, control the flight path of the deployed store, typically via RF signals transmitted to the missile, to provide greater targeting accuracy.

The signal conditioning means 28 of the present invention is adapted to selectively process a variety of signals, including discrete signals, analog signals and digital signals. For example, an aircraft 10 typically transmits a predetermined number of discrete signals to the associated store. These discrete signals are generally effected by actuating toggle switches mounted in an aircraft flight crew station or by actuating switches positioned on an associated joystick, such as a Measurements Systems Control Grip Model No. 349676. These discrete signals can include, among others, signals which select the signaling frequency of the host aircraft, the power level and polarity of the transmitter of the associated store and the position of the antenna of the store. The discrete signals can also activate the videocassette tape recorder (VCTR) of the data link pod 16 to record video images following deployment of an associated missile 12. In addition, the discrete signals can initiate and terminate a built in test (BIT) to verify that the universal signal conditioning apparatus 20, the associated missile and the data link pod, if any, are operable. Further, the discrete signals can select and simulate one of a plurality of preprogrammed flight plans and can select the field of view of the associated missile.

The universal signal conditioning apparatus 20 of one embodiment of the present invention preferably includes discrete signal processing means 44 to process the discrete signals received by the aircraft interface means 24 and to translate the received discrete signals to corresponding discrete or digital signals which the associated store is adapted to process. For example, an associated store may require each of the discrete signals provided by the aircraft 10 to be individually transmitted thereto in a predetermined order. Alternatively, the associated store may be adapted to process only predetermined ones of the discrete signals provided by the aircraft or may be adapted to process a combination of several of the discrete signals provided by the aircraft. Still further, the associated store may be adapted to digitally receive several of the discrete signals provided by the aircraft interface means.

Likewise, discrete signals can be transmitted from the associated store to the aircraft 10. These discrete signals may also require translation by the discrete signal processing means 44, as described above, based upon the particular types and format of discrete signals which the associated store and data link pod are adapted to transmit and the types and format of discrete signals which the aircraft is adapted to receive.

The aircraft 10 also preferably transmits a plurality of analog signals, via the aircraft interface means 24, to the associated store. The associated stores, however, are typically only adapted to receive, in addition to the discrete signals described above, digital signals. Accordingly, the signal conditioning means 28 of one embodiment also generally includes analog signal conversion means 46 for converting the analog signals received from the aircraft interface means to corresponding digital signals prior to transmitting the digital signals to the associated store, via the store interface means 26.

Likewise, the associated store generally transmits digital signals, via the store interface means 26, to the aircraft 10. The aircraft, however, is typically only adapted to receive, in addition to the discrete signals described above, analog signals. Accordingly, the signal conditioning means 28 can also include digital signal processing means 48 for converting the digital signals received from the store interface means to corresponding analog signals prior to transmitting to the aircraft, via the aircraft interface means 24.

The analog/digital signals transmitted between the aircraft 10 and the associated store, via the analog signal processing means 46 and the digital signal processing means 48 can include, among others, signals representing the x and y coordinates of a cursor positioned within the display of the aircraft controls and displays module 14. As known to those skilled in the art, adjustment of the cursor's position can, in some instances, further control the flight path of an associated missile 120.

Once an associated missile 12 has been deployed, the analog and digital signals transmitted between the aircraft 10 and the missile can also include a command track signal to guide the missile based upon the position of the cursor in the display of the aircraft controls and displays module 14. The signals transmitted following deployment of the store also include signals which select alternate fields of view and alternate polarities for signals transmitted by the deployed missile. For example, the signals transmitted following deployment of the missile can also include a return to midcourse guidance unit (MGU) control signal which allows autonomous targeting, and a forced correlate signal which allows operator control of missile impact point.

Thus, the universal signal conditioning method and apparatus of the present invention allows a store, such as a missile 12 or a data link pod 16, to communicate with and be deployed from a plurality of different types of host aircraft 10, each of which process signals according to a different predetermined format. Further, the universal signal conditioning method and apparatus of the present invention allows a store to communicate with and be deployed from a plurality of different types of aircraft without increasing the load on the central control processor of the aircraft, modifying the electrical wiring of the aircraft, such as the aircraft controls and displays module, or altering the commands or displays employed by the crew of the aircraft to deploy the store. Consequently, the number of aircraft that are able to communicate with and deploy a store is significantly increased and the flexibility of store deployment is correspondingly increased.

In addition, the universal signal conditioning method and apparatus of one embodiment of the present invention enables a plurality of different types of stores, such as a plurality of different types of missiles 12 and data link pods 16, each of which also process signals according to a different predetermined format, to be deployed from each of a plurality of different types of aircraft 10. Thus, the flexibility of store deployment is further increased by the method and apparatus of this embodiment of the present invention.

In the drawings and specifications, there has been set forth a preferred embodiment of the invention, and although specific terms are employed, they are used in generic and descriptive sense only and not for purpose of limitation.

That which is claimed is:

1. An apparatus for providing a universal electrical interface between an aircraft and an associated store, the apparatus comprising:

aircraft identification means for determining the type of the aircraft wherein the type of aircraft is one of a plurality of predetermined types of aircraft, each type of aircraft being adapted to process signals formatted according to a different predetermined format;

aircraft interface means, responsive to said aircraft identification means, for bidirectionally communicating with the aircraft according to a first predetermined format wherein the type of aircraft identified by said aircraft identification means is adapted to process signals according to the first predetermined format;

store interrogation means for determining the type of store associated with the aircraft wherein the type of store is one of a plurality of predetermined types of stores, each predetermined type of store being adapted to process signals formatted according to a different predetermined format;

store interface means, responsive to said store interrogation means, for bidirectionally communicating with the associated store according to a second predetermined format that the associated store is adapted to process, the second predetermined format being different than the first predetermined format;

signal conditioning means, responsive to said aircraft interface means and said store interface means, for selectively processing signals received by both said aircraft interface means and said store interface means, said signal conditioning means including means for translating signals received from said aircraft interface means according to the first predetermined format to the second predetermined format of the associated store prior to transmitting the signals to the associated store, and means for translating signals received from said store interface means according to the second predetermined format to the first predetermined format of the aircraft prior to transmitting the signals to the aircraft, such that each of the plurality of different types of aircraft can bidirectionally communicate with each of the plurality of different types of stores, according to the predetermined formats that the aircraft and the associated store are adapted to process;

power switching means, responsive to said signal conditioning means, for coupling electrical power from the aircraft to the associated store; and video relay means, responsive to said signal conditioning means, for transmitting video signals from the associated store to the aircraft.

2. An apparatus for providing a universal electrical interface between an aircraft and an associated store according to claim 1 wherein said signal conditioning means comprises:

discrete signal processing means for processing discrete signals received by both said aircraft interface means and said store interface means;

analog signal conversion means for converting analog signals received from said aircraft interface means to corresponding digital signals prior to transmitting the corresponding digital signals to said store interface means; and digital signal conversion means for converting digital signals received from said store interface means to corresponding analog signals prior to transmitting the corresponding analog signals to said aircraft interface means.

3. An apparatus for providing a universal electrical interface between an aircraft and an associated store according to claim 1 wherein said store interface means comprises:

primary and reserve data buses for transmitting signals to and from the associated store; and a bus controller for controlling signal transmission on said primary and reserve data buses between the associated store and said signal conditioning means such that signals are transmitted via said primary data bus if said primary data bus is available, and are only transmitted via said reserve data bus if said primary data bus is unavailable.

4. A universal signal conditioning apparatus for providing an electrical interface between an aircraft and an associated store wherein the associated store is adapted to communicate according to a predetermined format with the aircraft, the signal conditioning apparatus comprising:

aircraft identification means for determining the type of the aircraft wherein the type of aircraft is one of a plurality of predetermined types of aircraft, each type of aircraft being adapted to process signals formatted according to a different predetermined format;

store interrogation means for determining the type of store associated with the aircraft wherein the type of store is one of a plurality of predetermined types of stores, each predetermined type of store being adapted to process signals formatted according to a different predetermined format;

communications means for bidirectionally communicating with the aircraft according to the first predetermined format that the aircraft, identified by said aircraft identification means, is adapted to process, and for bidirectionally communicating with the associated store according to a second predetermined format that the associated store, identified by said store interrogation means, is adapted to process, the second predetermined format being different than the first predetermined format;

signal conditioning means, responsive to both said aircraft identification means and said communications means, for selectively processing signals received by said communications means according to the type of the aircraft and the type of the store such that each of the plurality of different types of aircraft can bidirectionally communicate, according to the predetermined respective formats that the aircraft and the store are adapted to process, with each of the plurality of different types of associated stores;

power switching means, responsive to said signal conditioning means, for coupling electrical power from the aircraft to the associated store; and video relay means, responsive to said signal conditioning means, for transmitting video signals from the associated store to the aircraft via a data link.

5. A universal signal conditioning apparatus according to claim 4 wherein said signal conditioning means comprises means for translating signals received by said communications means from the aircraft according to the first predetermined format to the second predetermined format of the associated store prior to transmitting the signals, via said communications means, to the associated store, and means for translating signals received by said communications means from the associated store according to the second predetermined format to the first predetermined format of the aircraft prior to transmitting the signals, via said communications means, to the aircraft.

6. A universal signal conditioning apparatus according to claim 4 wherein said signal conditioning means comprises:

a discrete signal processor for processing discrete signals received by said communications means from both the aircraft and the associated store;

an analog signal convertor for converting analog signals received by said communications means from the aircraft to corresponding digital signals prior to transmitting the corresponding digital signals, via said communications means, to the associated store; and a digital signal convertor for converting digital signals received by said communications means from the associated store to corresponding analog signals prior to transmitting the corresponding analog signals, via said communications means, to the aircraft.

7. A universal signal conditioning apparatus according to claim 4 wherein said communications means comprises:

primary and reserve data buses for transmitting signals to and from the associated store; and a bus controller for controlling signal transmission on said primary and reserve data buses between the associated store and said signal conditioning means such that signals are transmitted via said primary data bus if said primary data bus is available, and are only transmitted via said reserve data bus if said primary data bus is unavailable.

8. A method of universally electrically interconnecting an aircraft and an associated store wherein the associated store is adapted to communicate according to a predetermined format with an aircraft, the method comprising the steps of:

determining the type of aircraft wherein the type of aircraft is one of a plurality of predetermined types of aircraft, each predetermined type of aircraft being adapted to process signals formatted according to a different predetermined format;

determining the type of the associated store wherein the type of store is one of a plurality of predetermined types of stores, each predetermined type of store being adapted to process signals formatted according to a different predetermined format;

bidirectionally communicating with the aircraft according to a first predetermined format that the aircraft is adapted to process;

bidirectionally communicating with the associated store according to a second predetermined format that the associated store is adapted to process, the second predetermined format being different than the first predetermined format;

selectively processing signals received from the aircraft and the associated store during said bidirectional communicating steps according to the determined type of the aircraft such that each of the plurality of different types of aircraft can bidirectionally communicate with each of the plurality of different types of stores, according to the predetermined formats that the respective aircraft and associated store are adapted to process;

coupling electrical power from the aircraft to the associated store; and transmitting video signals from the associated store to the aircraft.

9. A method of universally electrically interconnecting an aircraft and an associated store according to claim 8 wherein said step of selectively processing signals comprises the steps of:

translating signals received from the aircraft according to the first predetermined format to the second predetermined format of the associated store prior to transmitting the signals to the associated store; and translating signals received from the associated store according to the second predetermined format to the first predetermined format of the aircraft prior to transmitting the signals to the aircraft.

10. A method of universally electrically interconnecting an aircraft and an associated store according to claim 8 wherein said step of selectively processing signals comprises the steps of:

processing discrete signals received from both the aircraft and the associated store;

converting analog signals received from the aircraft to corresponding digital signals prior to transmitting the corresponding digital signals to the associated store; and converting digital signals received from the associated store to corresponding analog signals prior to transmitting the corresponding analog signals to the aircraft.

11. A method of universally electrically interconnecting an aircraft and an associated store according to claim 8 wherein the associated store is coupled to both a primary and a reserve data bus, and wherein said step of bidirectionally communicating with the associated store comprises the steps of:

polling the primary data bus to determine if the primary data bus is available;

if the primary data bus is available, transmitting signals via the primary data bus; and if the primary data bus is unavailable, transmitting signals via the reserve data bus.

\* \* \* \* \*